United States Patent [19]
Long et al.

[11] Patent Number: 5,640,385
[45] Date of Patent: Jun. 17, 1997

[54] METHOD AND APPARATUS FOR SIMULTANEOUS WIDEBAND AND NARROWBAND WIRELESS COMMUNICATION

[75] Inventors: James F. Long, Glen Ellyn; Robert C. Elder, McHenry, both of Ill.

[73] Assignee: Motorola, Inc., Schaumburg, Ill.

[21] Appl. No.: 177,363

[22] Filed: Jan. 4, 1994

[51] Int. Cl.$^6$ .................................................. H04J 13/00
[52] U.S. Cl. .................................................. 370/335
[58] Field of Search .................. 370/18, 95.1, 95.3, 370/110.1, 68.1, 69.1, 73, 76, 11, 19, 119; 375/200, 205; 455/33.1, 33.2, 33.3; 379/59, 60

[56] References Cited

U.S. PATENT DOCUMENTS

| | | | |
|---|---|---|---|
| 4,425,642 | 1/1984 | Moses et al. | 370/19 |
| 4,476,559 | 10/1984 | Brolin et al. | 370/125 |
| 4,567,586 | 1/1986 | Roeck | 370/4 |
| 5,022,046 | 6/1991 | Morrow et al. | 370/18 |
| 5,109,417 | 4/1992 | Fielder et al. | 375/122 |
| 5,123,014 | 6/1992 | Federkins et al. | 455/33.1 |
| 5,175,743 | 12/1992 | Crespo et al. | 370/18 |
| 5,235,612 | 8/1993 | Stilwell et al. | 375/1 |
| 5,278,826 | 1/1994 | Murphy et al. | 370/76 |

FOREIGN PATENT DOCUMENTS

92/10891 6/1992 WIPO.

OTHER PUBLICATIONS

Schilling et al., *Broadband CDMA for Personal Communications Systems*, IEEE Communications Magazine, Nov. 1991, pp. 86–93.

Schilling, D. L., *B-CDMA Cellular Overlay to Increase Cellular Capacity by 500 Users*.

*Primary Examiner*—Douglas W. Olms
*Assistant Examiner*—Ajit Patel
*Attorney, Agent, or Firm*—Heather L. Creps

[57] ABSTRACT

A wireless communication system for simultaneously communicating overlapping wideband and narrowband signals. The system includes a transmitting station for embedding one or more narrowband signals (3–5) in a wideband signal (1) having a frequency spectrum encompassing the narrowband signals, and transmitting the resulting composite wideband signal (2). The system also includes a receiving station for receiving a composite wideband signal (60) and separating the embedded narrowband signal(s) (62, 63) from the wideband signal (61). In one embodiment, a cellular radiotelephone base station (35) is operable as both the transmitting and receiving station, communicating with remote subscriber units (29–31) having conventional transceivers (FDMA, TDMA and/or CDMA). The base station transmitter circuitry (10–17) includes FM and CDMA signal generators (10, 12), a combiner (15) for embedding the narrowband signal (3–5) in the wideband signal (1), and an AGC (14) and power detectors (11, 13) for controlling the narrowband signal power. The receiving circuitry includes a CDMA processing circuit having an FFT circuit (41), a threshold detector (42), a notch filter (43), and an inverse FFT circuit (44) for separating narrowband signals (62, 63) from the CDMA signal (61).

27 Claims, 5 Drawing Sheets

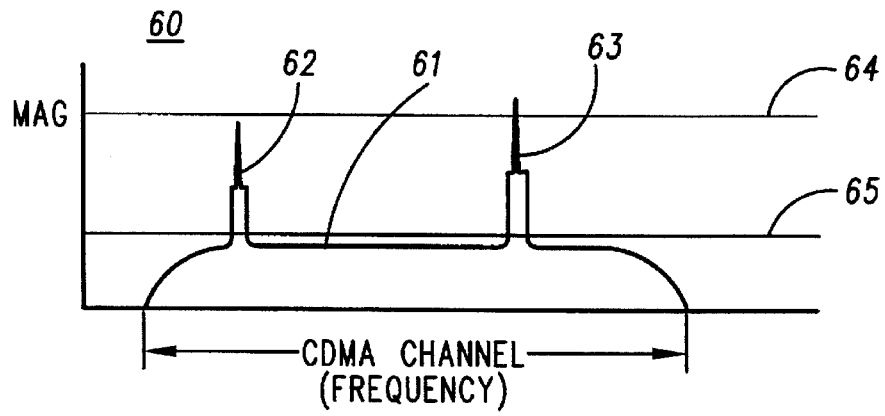
FIG.5
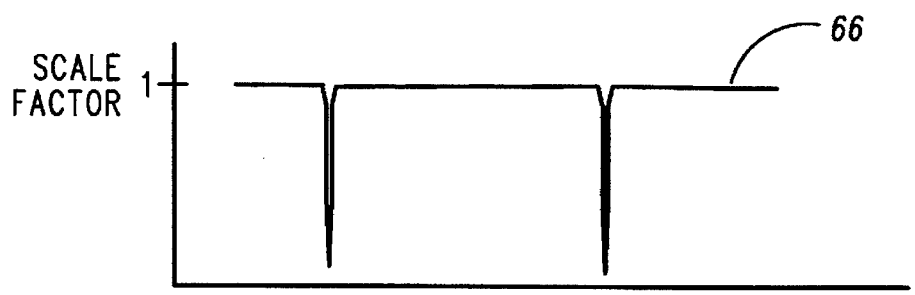
FIG.6
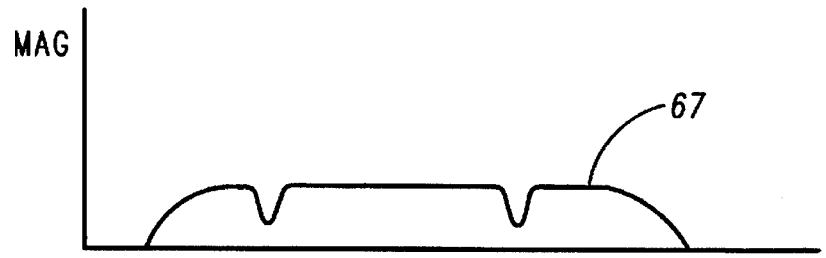
FIG.7
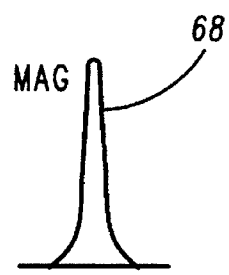 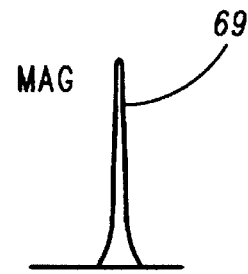
FIG.8    FIG.9

METHOD AND APPARATUS FOR SIMULTANEOUS WIDEBAND AND NARROWBAND WIRELESS COMMUNICATION

BACKGROUND OF THE INVENTION

The present invention is generally related to communication systems and, more particularly, wireless communication systems.

The purpose of a communication system is to transmit information-bearing signals from a source (transmitter) to a destination (receiver) using a channel. The transmitter processes (modulates) the message signal into a form suitable for transmission over the channel. The receiver then processes (demodulates) the received signal to reproduce an approximation of the original message signal. Modifications of the message signal achieved by modulation and numerous other suitable methods are well known in the art.

In any communication system, a key parameter which impacts system performance is the transmitter power. In a noise limited communication system, the transmitted power determines the allowable separation between the transmitter and receiver. The available transmitted power determines the signal-to-noise ratio, which must exceed some prescribed threshold at the receiver input for successful communication of information to occur.

Another key performance criterion for certain communication systems relates to the number of simultaneous users that can be accommodated. An example of one well known system application is a cellular radio telephone system. Such systems are typically comprised of a number of base sites, each having a service coverage area, and a number of mobile or hand portable cellular telephones or data terminals (hereinafter referred to as "subscribers"). The service coverage areas of base sites may be arranged to partially overlap in such a manner as to provide a substantially continuous coverage area in which a subscriber receiving service from one base site may be handed off to an adjacent base site with no interruption in service. Thus, it is a key goal for a cellular, as for other wireless communication systems, to effectively utilize the available spectrum so that as many users as possible can be accommodated.

One means of accomplishing this effective utilization is through signal multiplexing, in which signals from several message sources are simultaneously transmitted over a common spectral resource. Frequency division multiplex, time division multiplex, and mixtures thereof have traditionally been used for implementing signal multiplexed cellular radio systems.

In a frequency division multiplex (FDM) or frequency division multiple access (FDMA) system, the communication spectral resource is divided into several narrow frequency bands. For at least the time needed to communicate the desired traffic, one frequency division channel is occupied by a subscriber for communication to the base site. Another frequency channel is used for traffic from the base site to the subscriber.

Time-division multiplex (TDM) systems are another type of multiple access communication system. In a TDMA (time division multiple access) system, the spectral resource is divided into repeating time frames each having a plurality of time slots or time division channels. Each time division channel is assigned to a different communication link. In this scheme, a portion of a subscriber's information occurs during an assigned slot of a frame. This is followed by one or more other time slots where information to or from other subscribers is accommodated. This process is repeated with received information being appropriately reconstructed at the receiver.

When transmitting a message signal over a communication channel, both analog and digital transmission methods can be used. At present, digital methods have become preferred due to several operational advantages over analog methods, including, inter alia: increased immunity to channel noise and interference; flexible operation of the system; common format for the transmission of different kinds of message signals; improved security of communications through the use of digital encryption; and increased capacity.

Another multiple access system involves the use of wideband communications, as opposed to narrowband approaches like FDMA and TDMA. In cellular radiotelephone systems such wideband communications have been achieved using code division multiple access (CDMA) spread spectrum techniques. Such spread spectrum systems utilize a modulation technique for spreading the information being communicated over a wide frequency band. This frequency band is typically much wider than the minimum bandwidth required to transmit the information being sent.

In a direct sequence CDMA system, communication between two communication units is accomplished by spreading each transmitted signal over a wide frequency band with a unique user spreading code. As a result, a multiplicity of transmitted signals share the same frequency. The ability of such a system to work is based on the fact that each signal is specially time and/or frequency coded to facilitate its separation and reconstruction at the receiver. Particular transmitted signals are retrieved from the communication channel by despreading a signal from the sum of signals in the communication channel with a known user spreading code related to the particular spreading accomplished at the transmitter.

In the digital direct sequence system, radio carrier modulation is performed after spreading the user's information with a digital code sequence whose bit rate is much higher than the information rate. A pseudo-random number (PN) is used as a code to "spread" the spectrum. The receiver, by utilizing the same known PN, can properly decode the received signal even when corrupted with other user's spread signals and reproduce the original information. The number of simultaneous users that can be accommodated in such a system is dependent on the amount of spectrum "spreading" that is implemented.

Another type of spread spectrum communication is "frequency hopping". In frequency hopping, the frequency of the carrier is shifted using a pattern dictated by a code sequence. The transmitter jumps from one frequency to another within some predetermined set. At the receiver, the hopping sequence for the desired user is known and allows tracking of the user's hopping transmissions. Periodically, more than one user's signal will fall on the same frequency thereby causing interference. Information coding techniques (error correction coding) are used to enable reconstruction of the original information even when a fraction of the transmitted bursts are lost. There are also time hopping and time-frequency hopping schemes whose times of transmission are regulated by the code sequence.

Still another type of spread spectrum communication is pulse-FM or "chirp" modulation, in which a carrier is swept over a wide band during a given pulse interval.

Any of the multiple access systems can be utilized in cellular radio communication systems. In such cellular systems, several factors limit performance. Typically, in propagating through the channel, a transmitted signal is distorted because of nonlinearities and imperfections in the frequency response of the channel. Other sources of degradation are noise (thermal and man made) and adjacent and co-channel interference.

Besides the typical sources of degradation mentioned above, the majority of the noise associated with a received signal in a spread spectrum CDMA system comes from the other user's signals. In systems where only spread spectrum signals are transmitted in a given frequency band (typically 1.25 MHz wide in CDMA systems), this noise comes from other user's signals which are being transmitted in the same frequency band, albeit with unique user spreading codes. In mixed wideband/narrowband systems, a spread spectrum user will also view any narrowband FDMA or TDMA signals (e.g., 30 KHz wide AMPS signals) falling within the frequency band of the spread spectrum channel as noise. Similarly, a subscriber using narrowband communications will see the spread spectrum signal as wideband noise. When either signal is transmitted without a sufficient carrier-to-interference (C/I) level with respect to the other, the first signal may be lost due to the interference from the other.

However, such mixed wideband and narrowband communications systems are likely to become more common in the future. This result is being driven by the scarcity of spectrum available for all wireless communications. With significant portions of this spectrum currently allocated to narrowband services, but with a growing demand for the type of performance promised in wideband digital systems like CDMA, a system permitting simultaneous wideband and narrowband communications within the same frequency spectrum offers a needed solution to the limited spectrum.

Consequently, there remains a need for better solutions for using wideband and narrowband communications while minimizing noise and degradations due to interference between the two types of communication.

SUMMARY OF THE INVENTION

The present invention comprises a communications system employing overlapping wideband and narrowband communication channels. The system is operable for the simultaneous transmission of the wideband and narrowband signals.

In a particular embodiment, a transmitting station embeds one or more narrowband signals in a wideband signal having a frequency spectrum encompassing the narrowband signals. The resulting composite wideband signal is then transmitted. The system also includes a receiving station, which may be the same as the transmitting station, that receives a composite wideband signal and separates the embedded narrowband signal(s) from the wideband signal. The system may also include one or more remote units that are capable of transceiving a wideband or a narrowband signal, where the remote units preferably have conventional transceivers (FDMA, TDMA and/or CDMA).

In yet another embodiment, a cellular base station transmits and receives both wideband CDMA and narrowband FDMA or TDMA signals. When transmitting, the base station uses a combiner to embed into a wideband signal any narrowband signals having frequencies within the frequency band of the wideband signal, thus forming a composite wideband signal. The composite wideband signal is transmitted to subscribers. When receiving a composite wideband signal, the base station digitizes, transforms and frequency filters the composite wideband signal so as to separate the individual narrowband and wideband signals transmitted by subscribers.

These and yet other method and apparatus embodiments are described below and set forth in the claims.

BRIEF DESCRIPTION OF THE DRAWINGS

FIGS. 5–9 are graphical representations of signals resulting following the designated blocks of the cellular radiotelephone receiving system of FIG. 4;

DETAILED DESCRIPTION OF A PREFERRED EMBODIMENT

Figure 1:
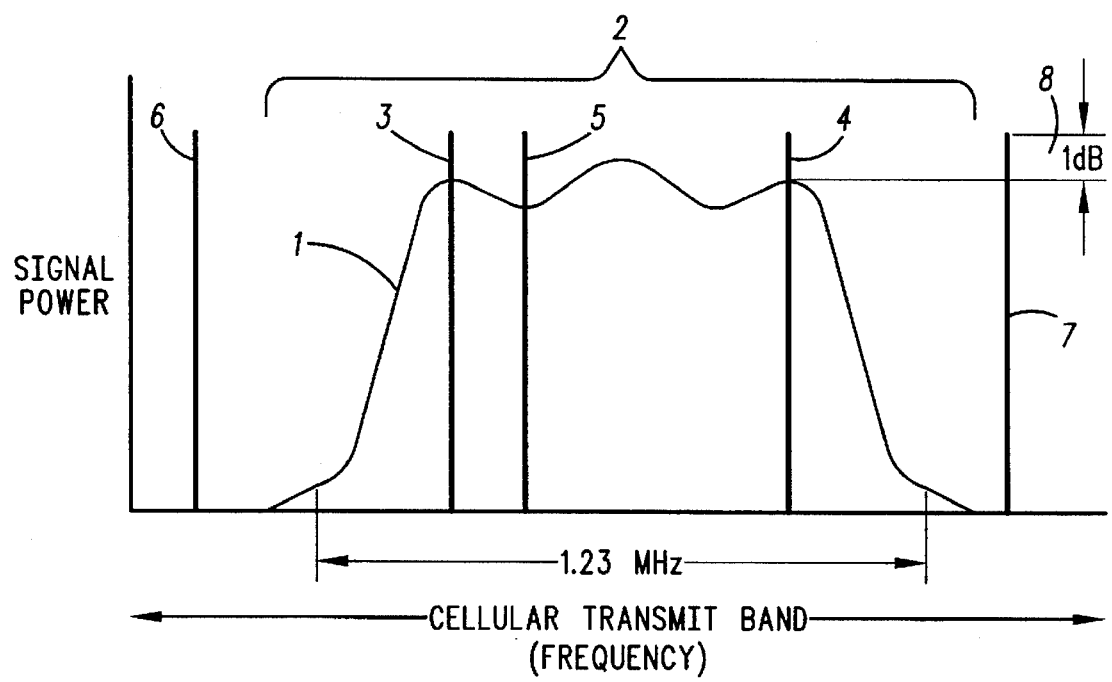
FIG. 1 is a graph illustrating a cellular wideband CDMA signal having narrowband FM signals embedded therein.

Beginning with FIG. 1, a frequency band is shown in which a wideband signal 1 has three narrowband signals 3–5 embedded therein. FIG. 1 illustrates a preferred embodiment in which the wideband signal 1 and narrowband signals 3–7 are being transmitted from the same cellular radiotelephone base station. In this preferred embodiment the wideband signal 1 is a DS-CDMA signal having a nominal bandwidth of 1.23 MHz, in which one or more encoded messages are transmitted to one or more subscribers in the service area of the base station. The narrowband signals 3–7 are FM signals, such as the 30 KHz bandwidth FDMA signals currently in use in, e.g., the Advanced Mobile Phone Service (AMPS).

This preferred embodiment is primarily for illustration based on the major implementation of the invention expected in North America. One skilled in the art will recognize that there are many other types of narrowband signals that may be employed just in the cellular environment, such as NAMPS (Narrowband AMPS), MCS-L2 (Japan's land Mobile Communications Service), and TDMA systems like GSM (Europe's Global System for Mobile communications) to name just a few. Further, while in most cellular embodiments it is anticipated that the wideband signal will be a CDMA signal, when broader signals such as a 48 MHz BCDMA signal are used, it is possible to use a spread spectrum signal such as a 1.23 MHz CDMA signal as the narrowband signal. In the context of other terrestrial and satellite systems there are even more possible combinations of narrowband and wideband signals to which the present invention applies.

A DS-CDMA signal is particularly advantageous for use as wideband signal 1. First, because the DS-CDMA signals are robust against narrowband "jamming" signals, there is a process gain advantage when recovering the wideband signal. Further, a typical FM receiver front end will see a DS-CDMA signal as wideband or AWGN (additive white Gaussian) noise, allowing recovery even when there are significant amounts of the wideband noise. Thus, when a digital receiver is used as taught by the present invention, adaptive "notch" or "bandstop" filtering can be applied to mitigate the interference caused by the overlapping spectrum utilization and recover both wideband and narrowband signals.

When a DS-CDMA signal 1 and FM signals 3–5 occupy the same frequency band, it is important that FM signals 3–5 are transmitted at signal levels which will maintain an acceptable C/I (carrier to interference ratio). This C/I should typically be at least 17 dB. Since the amount of noise appearing in the FM receiver channel is dependent solely on the detector filter bandwidth, one can calculate the amount of power by which the FM signals 3–5 must exceed the DS-CDMA signal 1. In the case of a composite wideband signal 2 having a 1.23 MHz bandwidth, where the narrowband FM signal 3 has a 30 KHz bandwidth, the noise power ratio will be 1.23 MHz / 30 KHz=41=16 dB. When, for example, the DS-CDMA signal 1 is received at the FM receiver at a level of 0 dBm, this signal 1 thus represents a −16 dBm interfering signal to the FM receiver. Therefore, in order to maintain a 17 db C/I level, the FM signal 3 must be transmitted at least 1 dB above the average power of the DS-CDMA signal.

It is important to note that for base station operations the FM and CDMA carriers should be transmitted from a common transmitter. If the FM and CDMA carriers are transmitted from different transmitters, and especially if the transmitters are not co-located, there is a much greater likelihood of interference to subscriber FM receivers above the 17 dB C/I level. Thus, while separate transmitters may be used, the additional complexities in processing and/or equipment required to insure sufficient C/I levels for all subscribers suggest that the best implementation will be a common transmitter at the base station.

FIG. 1 has been illustrated showing three embedded FM signals 3–5 primarily because a conventional frequency plan for AMPS is likely to place only 2 or 3 FM signals in a 1.23 MHz band. One skilled in the art will recognize, however, that implementations will differ based on the systems being combined.

For a combined DS-CDMA and FM cellular system, however, the presently preferred embodiment is one in which one CDMA channel is used per cell, with an average of 2 to 3 FM channels being used within the CDMA band. This preference results from the interference-limited nature of a DS-CDMA system, which places a limit on the number of potential users in the system. In other words, the total interference power in the forward link received signal is largely determinative of the number of users and the quality of service available for the users. This total interference power is mostly a result of the sector/cell CDMA self-interference, interference due to CDMA broadcasts from surrounding sectors/cells, and other (e.g. FM, TDMA, IM) interference. The forward link capacity has been described, taking into account such interference and other factors, in the following equation:

$$M=((W/R)(E_b/N_0))*(G_A*G_B/H_0)$$

where M is the number of simultaneous users per cell, W is the spread bandwidth, R is the digital voice bit rate, $E_b/N_0$ is the measure of system performance (signal energy per bit (J) per noise density (W/Hz)), GA is a 3 sector interference factor, $G_B$ is a voice activity factor, and $H_0$ is the interference from surrounding cells/sectors. If nominal values for these factors are given as W=1.228 MHz per carrier (and only one carrier is here assumed), R=9.6 Kbps, $E_b/N_0$=5, $G_A$=2.5, $G_B$=2.5, and $H_0$=1.6, then M has a nominal value of approximately 100.

From the above equation it is evident that capacity (M) is inversely related to interference from other cells. Moreover, it is evident that a significant increase in interference in a DS-CDMA system can be tolerated if the number of CDMA users is not too high. Thus, in the preferred embodiment only one CDMA channel is allocated per cell/sector. While at this time this represents less potential user capacity than that of a CDMA-only system, it does provide a significant increase in capacity while continuing to service existing FM subscribers. Also, with only one CDMA channel the probability of an FM carrier occupying a channel within that spectrum is reasonably low, and with planning by a skilled artisan can be made very low.

Figure 2:
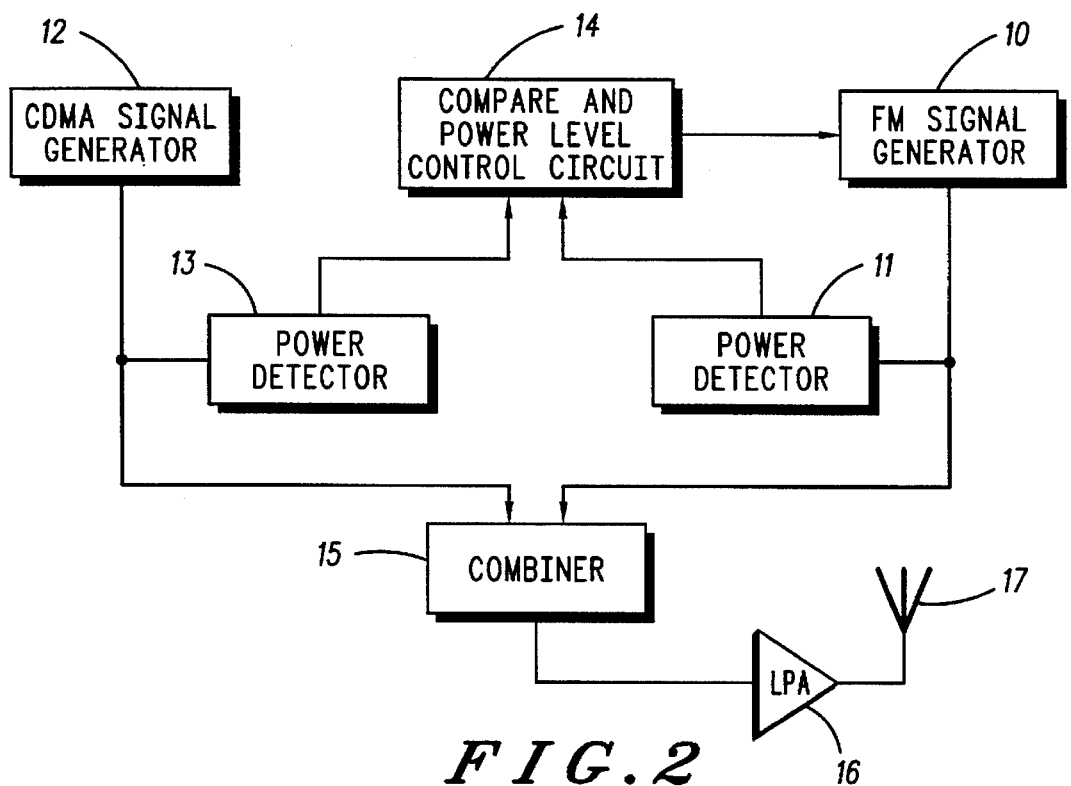
FIG. 2 is a block diagram of a cellular radiotelephone base station transmitter combining network according to the invention.

FIG. 2 is a block diagram of a system according to the present invention for combining a narrowband and wideband signal into a resulting composite wideband signal, such as signal 2 of FIG. 1. This system includes one or more narrowband signal generators 10 for generating the narrowband (e.g. FM) signals that will be embedded in the wideband (e.g. CDMA) signal, and at least one wideband generator 12. Power detectors 11 and 13 detect the power level of the signal outputs of signal generators 10 and 12, respectively, and the detected levels are compared in the compare/control circuit 14. Compare/control (AGC) circuit 14 provides a power level control loop to adjust the power level of the narrowband signal(s) in order to maintain an adequate C/I for subscribers receiving the narrowband signals. In the preferred embodiment for an AMPS system discussed above, compare/control circuit 14 allows the base station to maintain the narrowband FM signal(s) power level at least 1 dB greater than the power level of the wideband CDMA signal, thus better insuring that an FM subscriber will be able to recover the FM signal despite the presence of the CDMA signal.

Finally, combiner 15 combines the wideband signal and the narrowband signal(s) into a composite wideband signal. The composite wideband signal is then amplified by power amplifier 16, with the resulting amplified composite signal (e.g., signal 2 of FIG. 1) being transmitted via antenna 17 to the subscribers.

Figure 3:
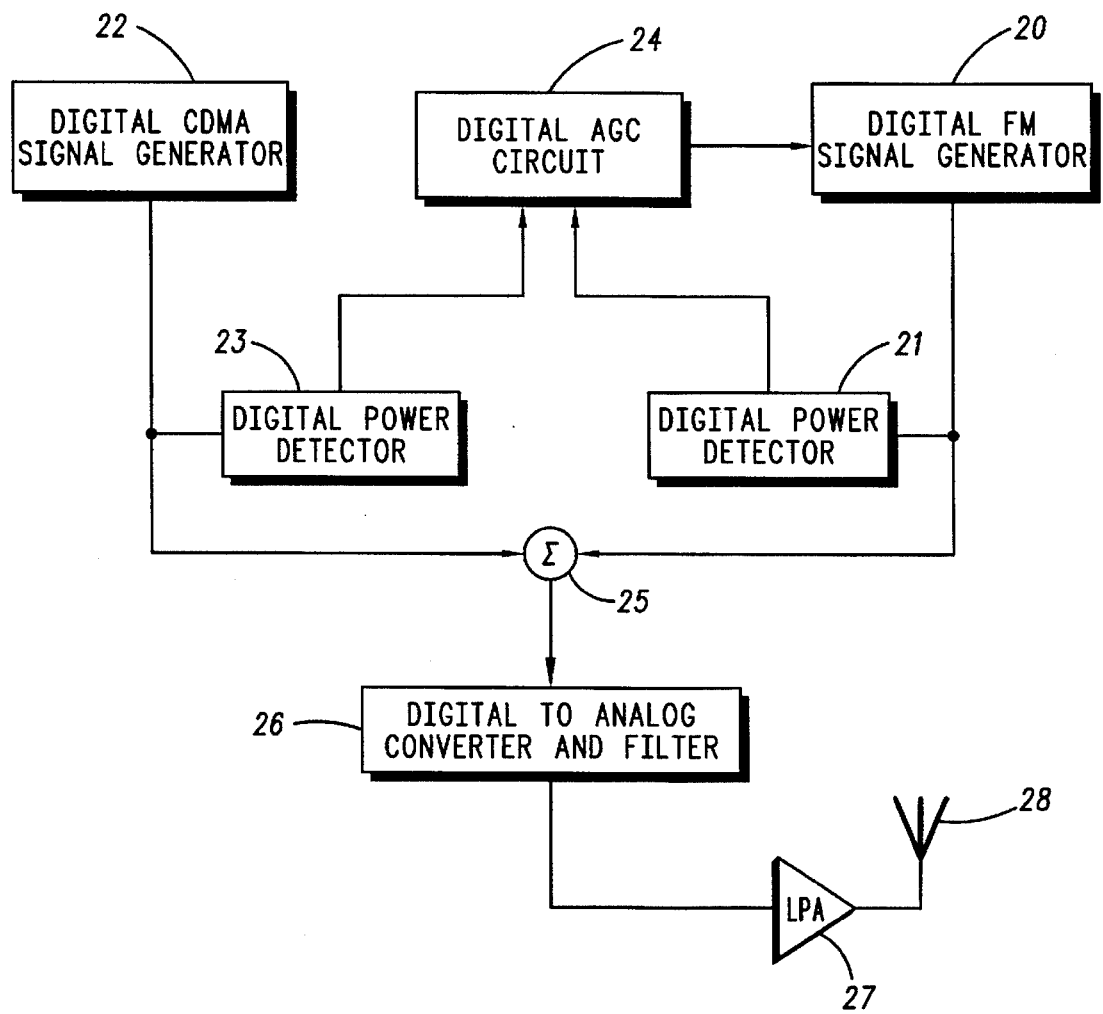
FIG. 3 is a block diagram of another embodiment of a cellular radiotelephone base station transmitter combining network according to the invention.

FIG. 3 is a block diagram of an alternative embodiment of the transmitting system of FIG. 2, in which the analog components (blocks 10–15) are replaced by digital circuitry (blocks 20–25 of FIG. 3) having similar functions. In this embodiment the wideband and narrowband signals are digitally generated and combined into a composite wideband signal. Following adder 25 is a D/A converter and filter 26, LPA 27 and antenna 28 for transmitting the composite signal to the subscribers. At present it is preferable to have an upconverter (not shown) between the filter 26 and LPA 27.

The embodiments discussed in FIGS. 1 through 3 provide a unique solution to the problem faced by subscribers in recovering CDMA and FM signals out of a composite signal, with numerous advantages over prior art systems. There is, however, a different challenge faced by a base station in a cellular system in recovering out of a received composite signal the individual CDMA and FM signals which have been transmitted from several different sources (i.e., the subscribers).

Referring now to FIGS. 4 through 9, this second challange is uniquely solved by a further embodiment of a cellular radiotelephone system, and in particular a base station system for receiving and recovering combined wideband (e.g., CDMA) and narrowband (e.g., FM) signals. Subscriber 29 transmits a CDMA signal 32, while subscribers 30 and 31 transmit FM signals 33 and 34, respectively, to base station 35. These signals 32-34 are received simultaneously by the antenna and RF front end 36 of base station 35, and the received signal is digitized in A/D converter 37. For purposes of illustration, the signals 33 and 34 will be assumed to be those falling within the frequency band of wideband signal 32, so all three signals 32–34 are received as a composite wideband signal at RF front end 36.

The digitized signal outputted from A/D 37 includes the digitized composite wideband signal, plus other narrowband signals falling within the base station's receive band but outside the frequency band of the wideband signal 32. All other signals outside of the receive band of the base station are filtered out by RF front end 36.

For each narrowband channel previously established by the base site controller (not shown) outside the frequency band of the wideband signal 32, the output of A/D 37 is fed to a digital downmixing and decimation filter, as illustrated by filter 38. Filter 38 downmixes to the baseband and narrowband filters the signal outputted by A/D 37. The filtered signal is then processed by FDMA/TDMA processor 39 for transmission to MSC 50 and PSTN 51. In the case of typical AMPS operations filter 38 has approximately 30 KHz bandwidth.

For those channels within the frequency band of the wideband signal 32, the output of A/D 37 is fed to digital filter 40. Digital filter 40, since it is being used here for a CDMA channel, has a bandwidth of approximately 1.23 MHz, sufficient to pass the CDMA signal.

For the CDMA channel, the output of digital filter 40 is next transformed, preferably using a fast Fourier transform. A representation of the output of FFT 41 is shown in FIG. 5. The signal received by the RF front end 36 has by then been bandpass filtered to only include the 1.23 MHz wide composite signal 60. This composite signal includes wideband signal 61 (which corresponds to CDMA signal 32) and narrowband signals 62 and 63 (which correspond to FM signals 33 and 34) embedded therein. This signal is processed by Bin threshold detector/High level carrier detector 42, which compares any narrowband signal amplitude in the channel with the predetermined thresholds 64 and 65. Any signals having a threshold above a first predetermined threshold 64 (signal 63 in the illustrated case) are always filtered by frequency domain notch filter 43, because the presence of these signals will always cause an unacceptable degradation in the quality of the recovered CDMA signal. Those signals having an amplitude between the first and second predetermined thresholds 64, 65 (e.g., signal 62) may or may not be filtered, depending on factors such as the level of degradation being caused to the CDMA signal by other interferers. The notch filter 43 preferably operates by generating a scaling factor (illustrated in FIG. 6) based on the amplitudes of the FM signals 62, 63. In the alternative, the notch filter 43 may operate by automatically setting a scaling factor for the FM signals 62, 63 using channel assignment information from, e.g., the base station controller (not shown), while using information from detector 42 to tune to and generate a scaling factor for any additional high level FM interferers in the CDMA band. In either case, the scaling factor is multiplied with signal 60 of FIG. 5 (i.e., the output of FFT 41), thus reducing the undesired signal components above the predetermined threshold to a level at or below the amplitude of the CDMA signal 61. Signal 67 of FIG. 7 is a representation of the product of notch filter 43. This signal 67 is then inverse transformed by inverse FFT 44, and processed by CDMA processor 45. In a preferred embodiment, all of the processes of digital filter 40, FFT 41, detector 42, notch filter 43 and inverse FFT 44 may be implemented with appropriate programming in a digital signal processor.

In the FM channels, the composite signal from digital filter 40 is downmixed in digital downmixing and decimation filters 46 and 47. Signal 68 of FIG. 8 is a representation of the output from filter 46, which corresponds to signal 63 of FIG. 5; signal 69 of FIG. 9 represents the output from filter 47 for a channel tuned to receive signal 34 of FIG. 4 (which also corresponds to signal 62 of FIG. 5). Following filters 46 and 47 are FDMA/TDMA processors 48 and 49, respectively, for processing the signals and transmitting the respective processed signals to PSTN 51 via MSC 50. Alternatively, one or more of the FM channels may also employ digital filters and/or frequency domain processing similar to the CDMA channel. In such cases, the digital filter for the channel of a signal embedded within CDMA signal 32 (e.g. FM signal 33) preferably has a bandwidth the same as the narrowband signal 33, 30 KHz, thus allowing for removal of the unwanted wideband components of the composite signal. However, it is presently preferable to omit the additional digital filters and frequency domain processing equipment in view of the additional processing required when using them.

Figure 4:
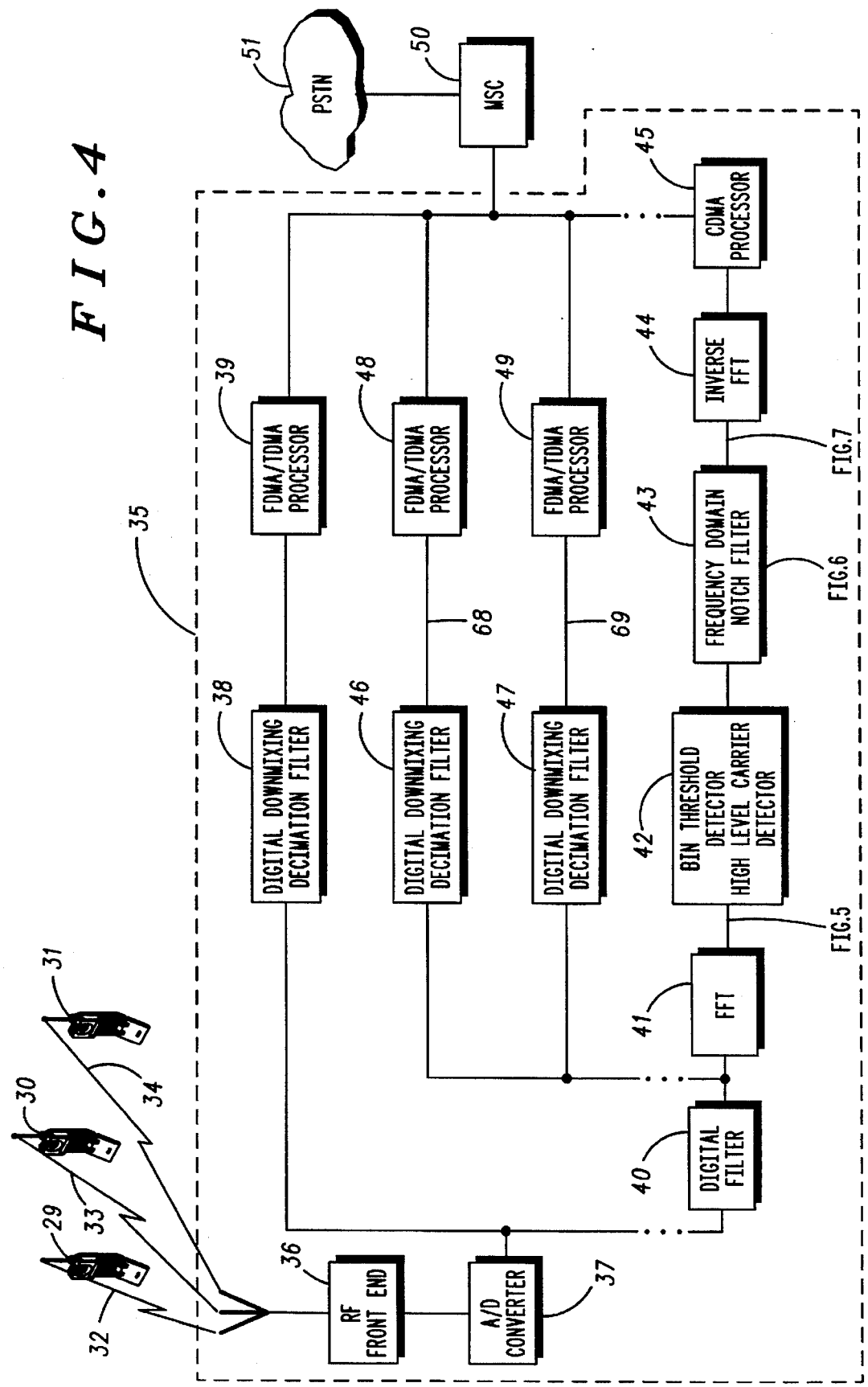
FIG. 4 is a block diagram of a cellular radiotelephone receiving system according to the invention.
Figure 10:
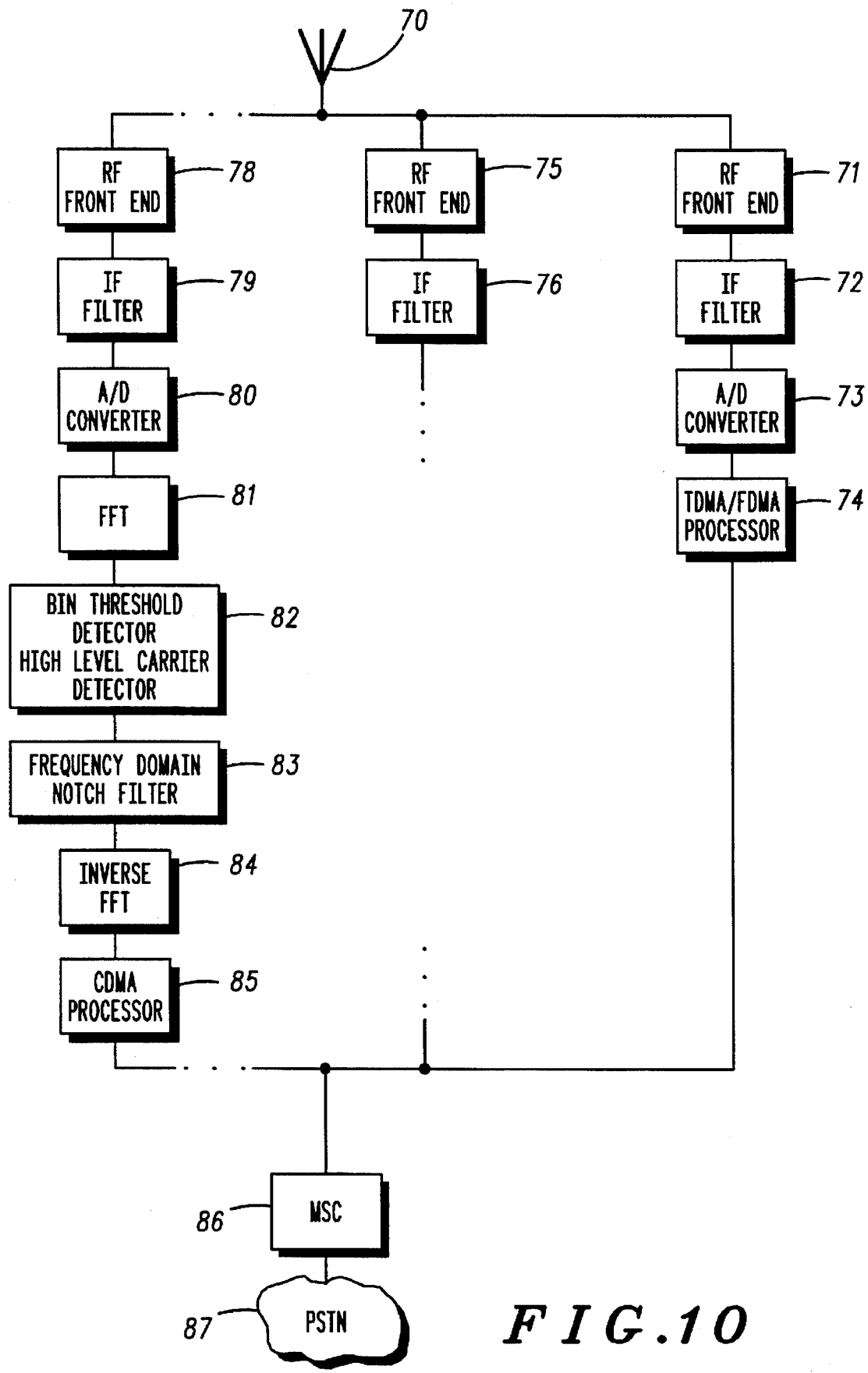
FIG. 10 is a block diagram of another embodiment of a cellular radiotelephone receiving system according to the invention.

FIG. 10 illustrates another embodiment of a base station system for receiving and recovering combined wideband (CDMA) and narrowband (FM) signals. In this embodiment the signals received at antenna 70 are fed into separate RF front ends 71, 75, 78 for the different channels. Following the RF front ends are IF filters 72, 76, 79 and A/D converters 73, 80. Unlike the embodiment of FIG. 4, the IF filters are set so as to bandpass filter all signal components outside the assigned signal for the channel. In other words, rather than setting the filter to allow a composite wideband signal to pass, the IF filters 72, 76 on FM channels are set to only allow the desired FM signal to pass. This approach allows one to add CDMA channel capabilities to existing base station architectures. The embodiment of FIG. 4 is presently preferable, however, because its digital backend gives more reprogramming flexibility as the system evolves and more CDMA channels are added.

The filtered signal from A/D 73 is conventionally processed in an FM processor 74 (e.g., a well-known AMPS processor, a TDMA processor, or the like). In the CDMA channel, the processing steps and components (i.e., FFT 81 through CDMA processor 85) following A/D 80 are the same as in FIG. 4 (i.e., FFT 41 through CDMA processor 45). These steps are preferably implemented with a digital processor back end added to existing base station equipment.

Even with the system of the present invention, there are likely to be occasions when a distant FM subscriber is not able to generate sufficient signal power to maintain a 17 dB C/I at the base station receiver. This is most likely to occur when one or more CDMA subscribers are located near the base station receiver. Among the possible alternatives for dealing with this near-far problem are provisions for some variety of port change (i.e., change to an alternative frequency in the same cell) or hand-off (i.e., change to service from another cell). The port change can be readily effected by transferring the FM channel to a frequency band that is not located within the CDMA frequency band. Where additional frequencies for such a port change are unavailable, an early hand-off can be made to an adjacent cell. Further, it is preferable to structure the frequency assignments so that FM channels being handed-off from adjacent cells into the target cell are not assigned to a frequency embedded within a CDMA frequency band. Conversely, dynamic or flexible reassignment should be used to effect an early port change or hand-off for those subscribers moving toward the boundary of the cell and using a FM frequency embedded in a CDMA frequency band. Finally, it is preferable to avoid any allocation of an FM frequency related to the CDMA clock frequency or CDMA carrier frequency, as the use of these frequencies may significantly degrade the CDMA process gain.

While particular embodiments of the system and methods according to the invention have been shown and described, it should be understood that the invention is not limited thereto since many modifications may be made. Further, while the above embodiment has been described in terms of a particular implementation for cellular radiotelephone systems, one skilled in the art may appreciate how the invention may be implemented in any wireless system in which a composite wideband signal is transmitted or received. It is therefore contemplated that the present invention covers any and all such modifications, which fall within the spirit and scope of the basic underlying principles disclosed and claimed herein.

We claim:

1. A wireless communication unit for sending and receiving communications by both wideband and narrowband signals, comprising:

a transmitter comprising means for generating a first narrowband modulated radio frequency signal and a first wideband modulated radio frequency signal, the first wideband modulated radio frequency signal comprising a spread spectrum signal;

a combiner responsive to the means for generating, for combining the first narrowband modulated radio frequency signal with the first wideband modulated radio frequency signal to form a first composite signal, the first composite signal having a first component derived from the first narrowband modulated radio frequency signal with a first frequency band and a second component derived from the first wideband modulated radio frequency signal with a second frequency band, the second frequency band overlapping the first frequency band, for transmission to at least one other wireless communication unit;

means for controlling signal power responsive to the means for generating, the means for controlling signal power varying signal power of the first narrowband modulated radio frequency signal in dependence on signal power of the first wideband modulated radio frequency signal: and means for receiving a second composite signal including a second wideband signal and a second narrowband signal, wherein the means for controlling is operable to maintain the signal power of the first narrowband modulated radio frequency signal at approximately a predetermined ratio relative to the signal power of the first wideband modulated radio frequency signal.

2. The wireless communication unit of claim 1; wherein the means for controlling comprises:

means for detecting the signal power levels of the first narrowband signal and the first wideband signal;

means for determining the predetermined ratio of the first narrowband signal to the first wideband signal required to maintain at least a predetermined carrier to interference (C/I) level of the narrowband signal for a subscriber receiving the narrowband signal;

means for adjusting the signal power level of the narrowband signal such that the predetermined ratio is maintained.

3. A wireless communication unit for sending and receiving communications by both wideband and narrowband signals, comprising:

a transmitter comprising means for generating a first narrowband modulated radio frequency signal and a first wideband modulated radio frequency signal, the first wideband modulated radio frequency signal comprising a spread spectrum signal;

a combiner responsive to the means for generating, for combining the first narrowband modulated radio frequency signal with the first wideband modulated radio frequency signal to form a first composite signal, the first composite signal having a first component derived from the first narrowband modulated radio frequency signal with a first frequency band and a second component derived from the first wideband modulated radio frequency signal with a second frequency band, the second frequency band overlapping the first frequency band, for transmission to at least one other wireless communication unit:

means for receiving a second composite signal including a second wideband modulated radio frequency signal and a second narrowband modulated radio frequency signal, the means for receiving comprising means for determining the location of the second narrowband modulated radio frequency signal within the second wideband modulated radio frequency signal and means for filtering at least one of the second narrowband modulated radio frequency signal at the determined location and the second wideband modulated radio frequency signal around the determined location of the second narrowband modulated radio frequency signal, wherein the means for determining comprises a transform means for performing a fast Fourier transform (FFT) on the second composite signal to produce frequency domain samples of both the second wideband modulated radio frequency signal and the second narrowband modulated radio frequency signal.

4. The wireless communication unit of claim 3, wherein the transform means is further operable for determining which samples have magnitudes exceeding a first predetermined threshold.

5. The wireless communication unit of claim 4, wherein the means for filtering is operable for filtering those samples determined to have magnitudes exceeding the first predetermined threshold from the those samples having magnitudes less than the first predetermined threshold.

6. The wireless communication unit of claim 5, wherein the means for filtering is further operable for adaptively notch filtering those samples determined to have magnitudes exceeding the first predetermined threshold such that the magnitudes of those samples are reduced approximately to a magnitude equal to the first predetermined threshold.

7. The wireless communication of claim 6, wherein the means for filtering is further operable for dynamically filtering narrowband signals based on their signal energy per bit per noise density ($E_b/N_0$).

8. The wireless system of claim 3, wherein the means for determining is operable for determining the location of the second narrowband modulated radio frequency signal using predetermined frequency reuse information.

9. A cellular radiotelephone system for communicating wideband and narrowband signals between at least one base station and subscribers, the system comprising:

a base station comprising:

a wideband modulated radio frequency signal generator for generating a first signal having a first frequency band, the first signal comprising a spread spectrum signal;

a narrowband modulated radio frequency signal generator for generating a second signal having a second frequency band, the second frequency band being narrower than the first frequency band;

a combiner combining the first and second signals to form a composite modulated radio frequency signal;

a transmitter transmitting the composite modulated radio frequency signal to a plurality of subscribers;

means for controlling signal power of the second wherein the means for controlling signal power comprises:

means for detecting signal power of the second signal and signal power of the first signal, and means for controlling the narrowband modulated radio frequency signal generator for adjusting the signal power of the second signal so as to maintain the signal power of the second signal within a predetermined range of ratios to the signal power of the first signal required to maintain at least a predetermined carrier to interference (C/I) level of the second signal for a subscriber receiving the second signal.

10. The system of claim 9, wherein the means for controlling the narrowband modulated radio frequency signal generator is operable for maintaining the signal power of the second signal at least 1 dB greater than the signal power of the first signal.

11. A cellular radiotelephone system for communicating wideband and narrowband signals between at least one base station and subscribers, the system comprising:

a base station comprising;

a wideband modulated radio frequency signal generator for generating a first signal having a first frequency band, the first signal comprising a spread spectrum signal;

a narrowband modulated radio frequency signal generator for generating a second signal having a second frequency band, the second frequency band being narrower than the first frequency band;

a combiner combining the first and second signals to form a composite modulated radio frequency signal;

a transmitter transmitting the composite modulated radio frequency signal to a plurality of subscribers; and means for reassigning a subscriber receiving communications via the second signal to receive communications via a narrowband signal having a third frequency band which is outside of the first frequency band.

12. The system of claim 11, wherein the means for reassigning is further operable for handing-off the subscriber to another base station.

13. A system for receiving communications via wideband signals from wideband signal subscribers to a fixed station, and via narrowband signals from narrowband signal subscribers to the fixed station, the system comprising:

a receiver detecting a composite wideband spread spectrum modulated radio frequency signal composed of at least a first one of the narrowband signals having a frequency band, and a first one of the wideband signals from a first one of the wideband signal subscribers, the first one of the wideband signals having a frequency band wider than and overlapping the frequency band of the first narrowband signal; and separating means including a first filter and a second filter, the separating means connected to the receiver means for separating and recovering the first narrowband signal and the first wideband signal, wherein the first filter comprises a first digital processor for frequency transforming the composite wideband spread spectrum modulated radio frequency signal, determining a frequency of the first narrowband signal, filtering the transformed composite wideband spread spectrum modulated radio frequency signal at the determined frequency of the first narrowband signal, and inverse transforming the filtered composite wideband spread spectrum modulated radio frequency signal to recover the first wideband signal.

14. The system of claim 13, wherein the first digital processor frequency transforms the composite wideband spread spectrum modulated radio frequency signal by a fast Fourier transform.

15. The system of claim 14, wherein the first digital processor filters the transformed composite wideband spread spectrum modulated radio frequency signal by reducing any frequency component of the transformed composite wideband spread spectrum modulated radio frequency signal having an amplitude above a first predetermined amplitude level to a reduced amplitude which is no more than a second predetermined amplitude level.

16. The system of claim 15, wherein the second predetermined amplitude level is an average amplitude level of any frequency components of the transformed composite wideband spread spectrum modulated radio frequency signal which are less than the first predetermined amplitude level.

17. The system of claim 13, wherein the frequency of the first narrowband signal is determined from an assigned channel frequency for a subscriber sending the first narrowband signal.

18. The system of claim 13, wherein the second filter means comprises a second digital processor means for digitally downmixing and decimation filtering the composite wideband signal to recover the first narrowband signal.

19. A system for receiving communications via wideband signals from wideband signal subscribers to a fixed station, and via narrowband signals from narrowband signal subscribers to the fixed station; the system comprising:

a receiver detecting a composite wideband spread spectrum modulated radio frequency signal composed of at least a first one of the narrowband signals having a frequency band, and a first one of the wideband signals from a first one of the wideband signal subscribers, the first one of the wideband signals having a frequency band wider than and overlapping the frequency band of the first narrowband signal; and separating means including a first filter and a second filter, the separating means connected to the receiver means for separating and recovering the first narrowband signal and the first wideband signal;

wherein the second filter comprises a second digital processor for frequency transforming the composite wideband spread spectrum modulated radio frequency signal, determining a frequency of the first narrowband signal, filtering the transformed composite wideband spread spectrum modulated radio frequency signal at the determined frequency of the first narrowband signal, and inverse transforming the filtered composite wideband spread spectrum modulated radio frequency signal to recover the first narrowband signal.

20. The system of claim 19, wherein the second digital processor means is operable for filtering the transformed composite wideband spread spectrum modulated radio frequency signal by digital downmixing the transformed composite wideband spread spectrum modulated radio frequency signal and bandpass filtering the downmixed signal around the determined frequency of the first narrowband signal.

21. The system of claim 20, wherein the frequency of the first narrowband signal is determined from an assigned channel frequency for a subscriber sending the first narrowband signal.

22. A system for receiving communications via wideband signals from wideband signal subscribers to a fixed station, and via narrowband signals from narrowband signal subscribers to the fixed station, the system comprising:

a receiver detecting a composite wideband spread spectrum modulated radio frequency signal composed of at least a first one of the narrowband signals having a frequency band, and a first one of the wideband signals from a first one of the wideband signal subscribers, the first one of the wideband signals having a frequency band wider than and overlapping the frequency band of the first narrowband signal;

separating means connected to the receiver means for separating and recovering the first narrowband signal and the first wideband signal: and means for reassigning a subscriber transmitting communications via the first narrowband signal to receiving communications via a second narrowband signal having a frequency band which is outside of the frequency band of the first wideband signal.

23. The system of claim 22, wherein the means for reassigning is further operable for handing-off the subscriber to another base station.

24. A cellular radiotelephone system for simultaneously communicating wideband and narrowband signals between at least one base station and subscribers, the system comprising:

a base station transmitter circuitry comprising:

a wideband signal generator operable for generating a first wideband signal characterized by a first frequency band;

a narrowband signal generator operable for generating a first narrowband signal characterized by a second frequency band within the first frequency band;

a combiner coupled to the wideband and narrowband signal generators, being operable for combining the first narrowband and first wideband signals and outputting a first composite wideband signal;

an amplifier and antenna connected to the combiner, being operable for amplifying the first composite wideband signal and transmitting the amplified first composite wideband signal to a plurality of subscribers; and a base station receiver circuitry comprising:

an RF front end circuitry operable for receiving a second composite wideband signal having at least a second narrowband signal embedded in a second wideband signal;

an analog to digital converter connected to the RF front end circuitry operable for outputting a digitized second composite wideband signal;

a narrowband signal processing circuit connected to the analog to digital converter, and comprising a down-mixing and decimation filter operable for recovering the second narrowband signal; and a wideband signal processing circuit connected to the analog to digital converter, and comprising a transformation circuit connected to the converter operable for transforming the digitized second composite wideband signal into a frequency domain composite signal, a narrowband signal detector connected to the transformation circuit operable for determining the frequency of the second narrowband signal, a filter connected to the narrowband signal detector operable for filtering the frequency domain composite signal at the determined frequency of the second narrowband signal and outputting a frequency domain representation of the second wideband signal, and inverse transformation circuitry connected to the filter operable for inverse transforming the frequency domain representation of the second wideband signal to recover the second wideband signal.

25. A method for wireless communications, comprising:

modulating first information into a narrowband signal for communication with a first remote unit having a narrowband demodulator;

modulating second information into a wideband signal for communication with a second remote unit having a wideband demodulator:

embedding the narrowband signal within the wideband signal to form a composite wideband signal;

transmitting the composite wideband signal to the first and second remote units;

detecting signal power levels of the narrowband signal and the wideband signal;

determining a predetermined ratio of the signal power level of the narrowband signal to the signal power level of the wideband signal required to maintain at least a predetermined carrier to interference (C/I) level of the narrowband signal for a subscriber receiving the narrowband signal; and adjusting the signal power level of the narrowband signal such that the predetermined ratio is maintained.

26. The method of claim 25, further comprising the steps of:

receiving at the second remote unit the composite wideband signal having said predetermined ratio between the signal power levels of the narrowband and wideband signals;

processing the composite wideband signal to recover the wideband signal; and demodulating the recovered wideband signal to recover the second information.

27. The method of claim 25, further comprising reassigning the first remote unit to receive communications via a further narrowband signal having a frequency band which is outside of a frequency band of the wideband signal.

* * * * *

UNITED STATES PATENT AND TRADEMARK OFFICE
CERTIFICATE OF CORRECTION

PATENT NO. : 5,640,385
DATED : June 17, 1997
INVENTOR(S) : Long, et al.

It is certified that error appears in the above-indentified patent and that said Letters Patent is hereby corrected as shown below:

Column 9, line 43 reads "signal:" should be --signal;--.

Column 11, line 7 reads "second" should be --second signal,--.

Column 12, line 37 reads "station;" should be --station,--.

Column 13, line 19 reads "signal:" should be --signal;--.

Signed and Sealed this

Thirteenth Day of January, 1998

Attest:

BRUCE LEHMAN

Attesting Officer

Commissioner of Patents and Trademarks